March 3, 1964 G. B. STEPHENS 3,123,325
AIRCRAFT ARRESTER
Filed Aug. 8, 1962 3 Sheets-Sheet 1
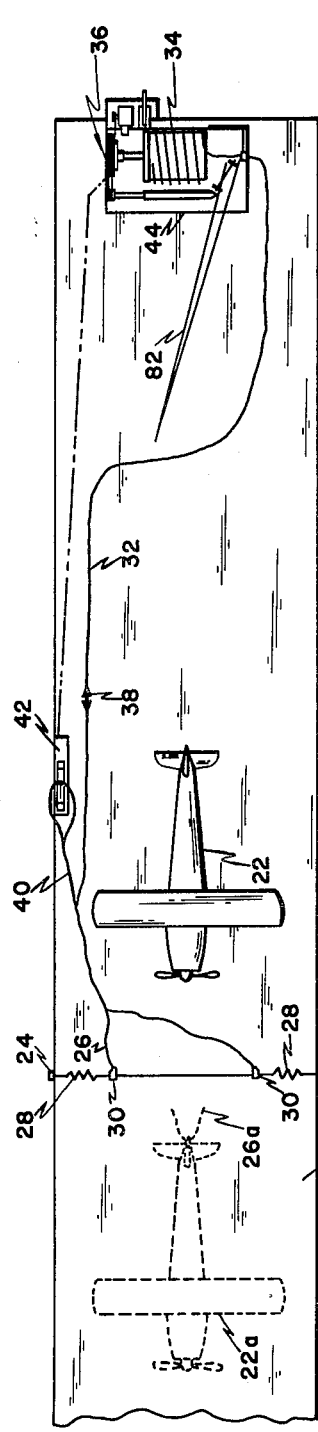
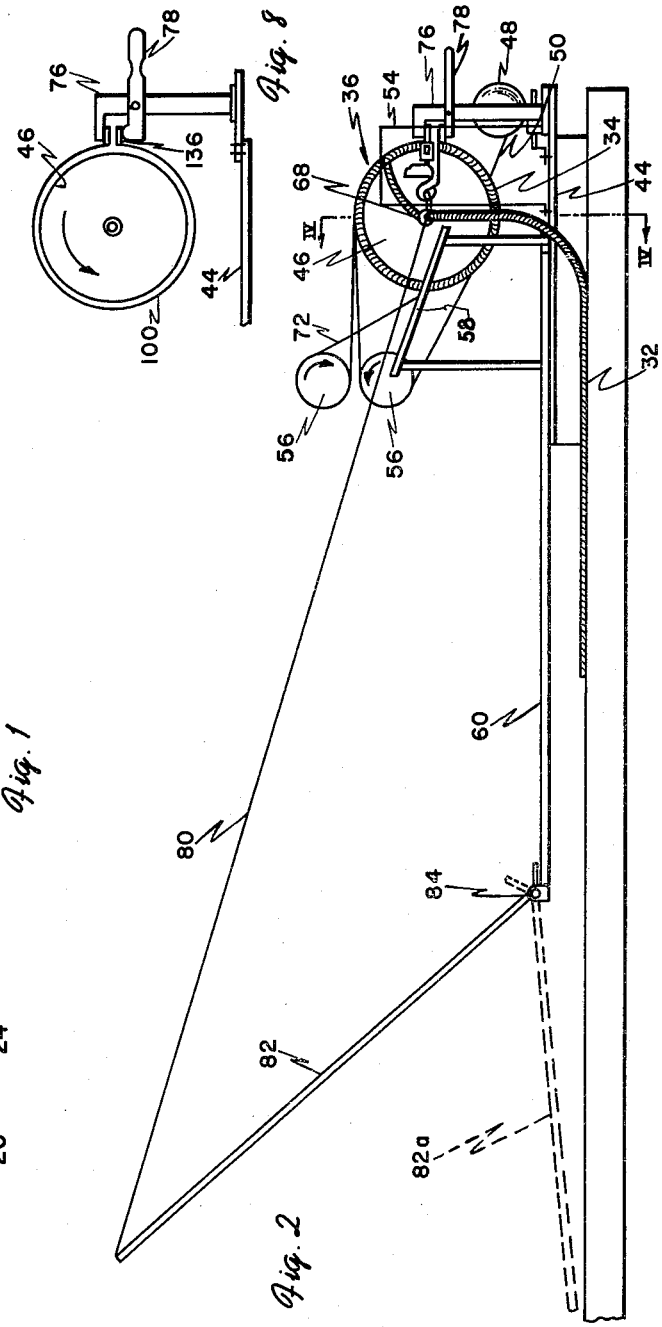
INVENTOR.
GEORGE B STEPHENS
BY
ATTORNEY March 3, 1964  G. B. STEPHENS  3,123,325
AIRCRAFT ARRESTER
Filed Aug. 8, 1962  3 Sheets-Sheet 2
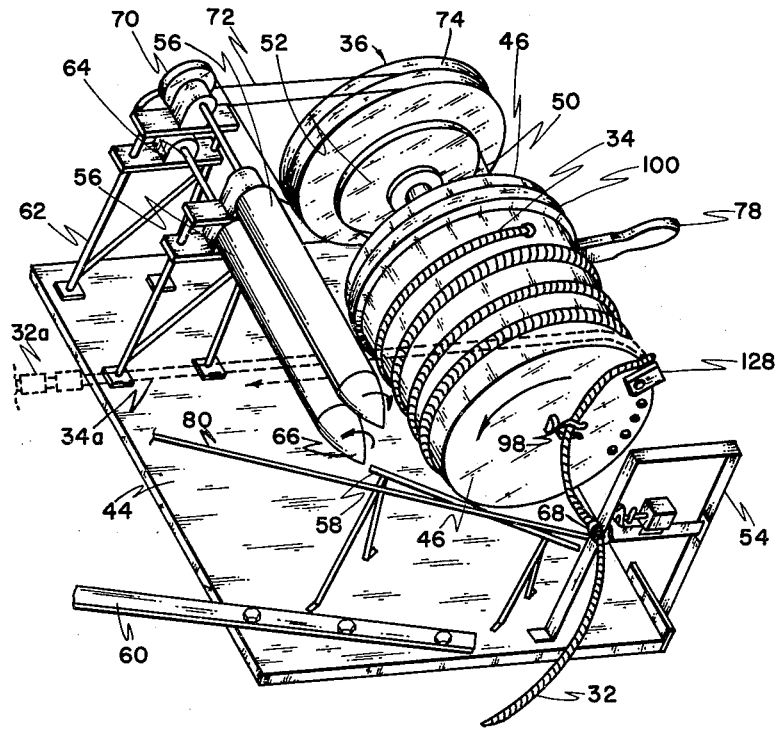
Fig. 3
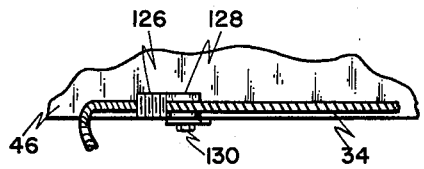
Fig. 6
Fig. 7
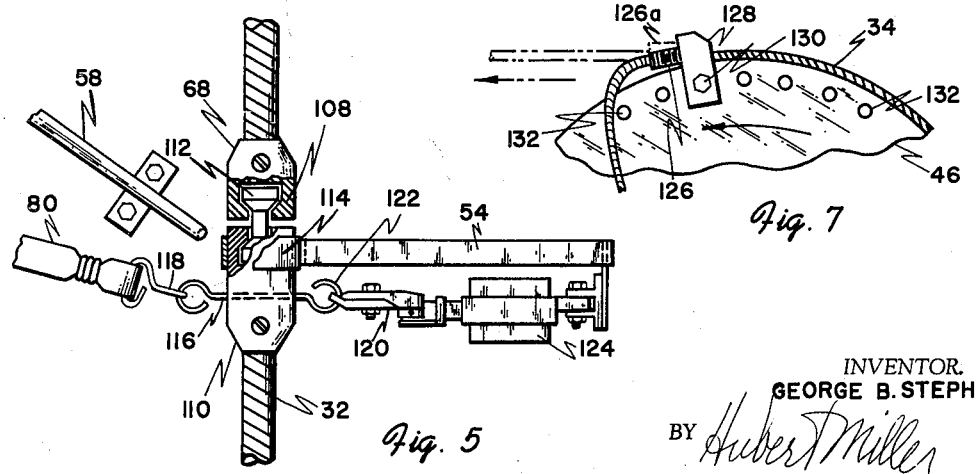
Fig. 5
INVENTOR.
GEORGE B. STEPHENS
BY Hubert Miller
ATTORNEY March 3, 1964 G. B. STEPHENS 3,123,325
AIRCRAFT ARRESTER Filed Aug. 8, 1962 3 Sheets-Sheet 3

INVENTOR.
GEORGE B. STEPHENS
BY Hubert Miller
ATTORNEY

United States Patent Office
3,123,325
Patented Mar. 3, 1964

3,123,325
AIRCRAFT ARRESTER
George B. Stephens, 7510 E. Gilbert, Wichita 7, Kans.
Filed Aug. 8, 1962, Ser. No. 215,581
10 Claims. (Cl. 244—110)

The application relates to a motion arrester of the braking cable type. It more particularly relates to a braking drum and cable system primarily adapted for arresting motion of an aircraft when landing.

An object of the invention, for purposes of controlling the cable used for braking the aircraft, is the provision of rotatable drum mechanism on which the cable is stored and which is installed near the end of an aircraft landing strip, and an adjustable braking means for the drum for slowing down rotation of the mechanism as the cable unfeeds therefrom, thus braking the craft in a controlled manner.

Another object, in line with the mechanism provided according to the foregoing objective, is to provide an interposed rotary coupling device which is connected between the free end portion of the cable on the drum, and one end of a cable section provided for engagement with the moving aircraft, and which accommodates relative rotation so that the drum independently takes up preliminary rotation before the relatively stationary cable section undergoes the force of engagement with the craft. I provide a drive motor and a speedometer on the drum, enabling the operator to rotate the drum at a peripheral speed approximately matching the estimated speed which the craft will possess upon landing; hence there is no appreciable inertia problem so far as concerns the major portion of the cable (i.e., the mass of cable on the drum), and engagement takes place smoothly to obviate excessive strain on both the cable and the drum.

Another object of the invention is the provision of a novel releasable means to retain the free end of the cable on the drum during its preliminary rotation and prior to landing assist.

An additional object, in line with the immediately preceding object, is to provide an automatic delay mechanism for actuating the releasable means in a way to retain the free end of the cable on the drum to the right point, and then automatically actuate the releasable means in time to the proper rotative attitude of the drum for releasing the free end of the cable in the right direction of payout.

Further features, objects, and advantages will either be specifically pointed out or become apparent when, for a better understanding of the invention, reference is made to the following description, taken in conjunction with the accompanying drawings which form a part hereof and in which:

FIGURE 1 is a view in plan showing a landing strip, a moving aircraft thereon, and a cable-type motion arrester embodying the present invention;

FIGURE 2 is a view in side elevation of the cable drum mechanism and snapline mast of the arrester of FIGURE 1;

FIGURE 3 is an isometric view of the drum mechanism including the cable coupling and a cable retainer on the drum;

FIGURE 5 is a fragmentary view in plan of a detail of the coupling of FIGURE 3;

FIGURES 6 and 7 are fragmentary plan and elevational views of a detail of the retainer of FIGURE 3;

FIGURE 8 is a view of the brake of the braked drum of FIGURES 1 and 3;

Figure 4:
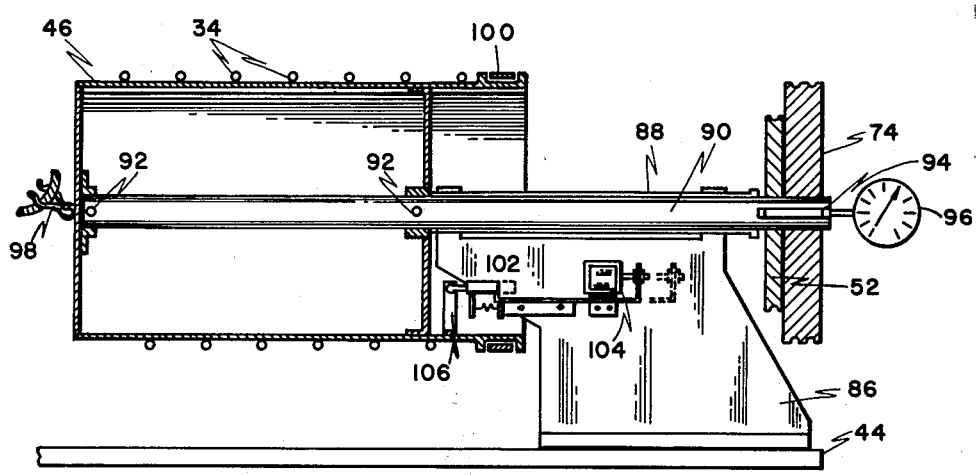
FIGURE 4 is an elevational view showing the drum in longitudinal section.

More particularly in FIG. 1 of the drawings, a strip 20 for landing aircraft 22 is shown having a pair of short uprights 24 at opposite sides of the landing strip. The uprights 24 support a hook-on loop 26 in a slightly elevated position across the path of the craft 22. Spring connections 28 secured to the uprights 24 enable the hook-on loop 26 to be restored to the elevated position after the wheels of the aircraft roll over the loop; two clips 30 are connected to the springs 28 for releasably holding the loop so that a hook, not shown, beneath the aircraft 22 can engage and remove the loop 26 from the clips. The craft and the loop move off in unison in the direction of their respective dotted line positions 22a and 26a.

A section of braking cable 32 is connected at one end to the hook-on loop 26 and is connected at the other end to a considerable length of braking cable 34 wound on a drum mechanism generally indicated at 36. The drum mechanism 36 is located near the end of the strip 20 along the glide path of the craft 22, just behind the point where the craft touches down. The section 32 of the cable is laid out slack on the ground and includes a cable tension safety link 38 effective to break under excessive tension and thereby prevent undue overload from being applied by the cable to the drum mechanism 36 or to the airplane. A short messenger line 40 connects a normally open arming switch 42 to the cable section at a point indicated on the cable between the loop 26 and the safety link 38.

In FIGURES 2 and 3, the drum mechanism 36 at the head of the landing strip includes a platform 44 providing a common support for a drum 46 for the cable 34, a drive motor 48 having a belt connection 50 to a drum driving sheave 52, a release solenoid support 54, and a pair of taut cable rolls 56. The platform 44 also carries a mast outrigger 60 and a supporting stand for a deflecting rail 58.

A roll stand 62 is secured to the support platform 44 and journals a pair of roll shafts 64 so that the rolls 56 carried thereby are in an overhanging position with their outer ends free. These outer ends of the rolls 56 are beveled at 66 and freely receive the free end portion of the cable 34 when it is trained therebetween. This free end portion has a coupling 68 connecting it to the adjacent end of the slack section 32 and can readily follow along the deflecting rail 58 into the dotted line position 34a trained between the rolls 56.

The roll shafts 64 carry individual driven sheaves 70, driven by belts 72 from drive sheaves 74 which rotate at the speed of the drum 46. The upper roll 56 rotates in the opposite direction from the lower roll 56 and from the drum 46, and a sheave diameter ratio is selected so that the peripheral speed of the rolls slightly exceeds the peripheral speed of the drum 46.

When the cable is in the position shown by the dotted lines 34a, the rolls 56 insure that it keeps unfeeding without wadding in case the craft separates from the slack section 32. The craft can leave the cable section 32 behind either unintentionally due to a cable section failure, or intentionally in case the pilot aborts the braking cable by disengaging the hook, previously mentioned.

A band brake stand 76 on the support platform 44 carries a brake control lever 78 for braking the drum 46 in either direction.

Automatic means is provided for rapidly snapping the braking cable into the trained position between the cable rolls 46. In FIGS. 2 and 3, an elastic snapline 80, such as a shock is secured at one end to the coupling 68 and at its opposite end to the free end of a snapline mast 82.

The snapline firmly holds the mast in the position shown. As long as the coupling 68 is restrained in the vicinity of release solenoid support 54, the mast 82 is held in an outwardly inclined position on the outrigger 60, which has a pivotal connection 84 to the base of the mast. When the coupling 68 is released, the tension of the snapline pulls the cable between the rolls 56, and the mast falls into the dotted line position 82a.

In FIG. 4, an upright drum stand 86 on the support platform 44 carries a tubular housing 88 in which a drum shaft 90 is journaled for rotation in spaced-apart, fixed bearings, not shown. The shaft 90 supports the drum 46 at one end in an overhanging relation to the drum stand and is secured fast to the drum by means of pins 92.

At the opposite end, the shaft 90 is keyed to the sheaves 52 and 74, which it supports in an overhanging position. A speedometer 96 is connected to the shaft 90.

A cable clamp spring 98 is secured to the overhanging end of the drum 46 by means of an eyelet at the drum axis and freely releases the cable 34 to the action of the rolls 56 which then strip the free end portion of the cable from the drum 46. A band brake 100 encircles the opposite end of the drum and is adjustably controlled by the control lever 78 previously described.

The drum stand 86 supports a shiftable release solenoid switch 102 which is under the control of an arming solenoid 104. The solenoid 104 is connected in circuit with the arming switch 42 (FIG. 1), responding to actuation of said switch 42 by shifting the release solenoid switch 102 into the path of a drum trigger bar forming an actuator 106 on the drum 46. The angular position of the actuator 106 is selected with respect to the rotative position of the drum 46, so that when the switch 102 and the coupling 68 held by the release solenoid support 54 are actuated, they will release the cable 34 to unfeed toward the landing aircraft.

The support and actuation of the coupling 68 by means of the release solenoid support 54 are best understood from FIG. 5. The coupling 68 consists of a movable bearing part 108 and a fixed bearing part 110 which are swivelly secured together by a dumbbell-shaped, interconnecting bearing element 112. The fixed bearing part 110 is removably carried between the jaws of a C-shaped spring clip 114 secured to the support 54.

A rod 116 is made secure to the fixed bearing part 110 and provides a releasable loop connection between the part 110 and a short-billed hook 118 carried by the snapline 80. A pair of anchor pincers 120 releasably holds an opposite loop 122 presented by the rod 116 and a release solenoid 124 electrically controls release of the anchor pincers 120 from the loop.

When the solenoid 124 operates, the snapline 80 is under sufficient tension to strip the coupling 68 from the open side of the clip 114. The cable is immediately drawn along the deflecting rail 58 in the manner described so as to be trained between the cable rolls.

The support 54 of FIGS. 2, 3 and 5 is arranged to hold the coupling 68 in line with the axis of the drum 46, and the coupling 68 in turn holds the adjacent ends of the cable section 32 and the main portion of the cable 34 in axial alignment for relative rotation. Hence, under influence of the drive motor 48, the drum 46 is free to be given preliminary rotation. The bearing in the coupling 68 accommodates this relative rotation without kinking or twisting the stationary slack section 32, and the ultimate force of engagement of the craft with the slack section 32 thus does not tend to tear away the drum from its stand.

Means is provided to hold the cable on the rotating drum so that the free end is positively restraind until stripped off by the rolls 56. In FIGS. 6 and 7, the cable 34 on the drum has a swaged collar 126 made fast thereto and engaging the leading edge of a grooved, cable-receiving bracket 128 which is secured by a bolt 130 to the cable drum 46. The bracket 128 is circumferentially adjustable in its position on the drum due to provision of a series of circumferentially spaced-apart bolt holes 132 which selectively receive the bolt 130; cable sometimes lengthens in the course of use and the adjustment is essential to keep the bracket 128 in snug engagement with the collar 126 each time the cable is rewound on the drum.

In unfeeding from the drum, the cable leaves in the direction of the dotted arrow of FIG. 7, and the collar raises into the dotted line position 126a and continues in a tangential direction with the cable. The bracket 128 rotates downwardly along its fixed circular path and thus the cable is stripped from the groove of the bracket.

In FIG. 8, the band brake stand 76 supports the fixed end of the brake band 100 encircling the drum 46. The free end 136 of the band is controlled by the control lever 78 so as to wrap in the unfeeding direction of drum rotation as indicated by the arrow in FIG. 8. In this way, the brake desirably affords considerably more braking force in the unfeeding direction rather than in the rewinding direction.

Figure 9:
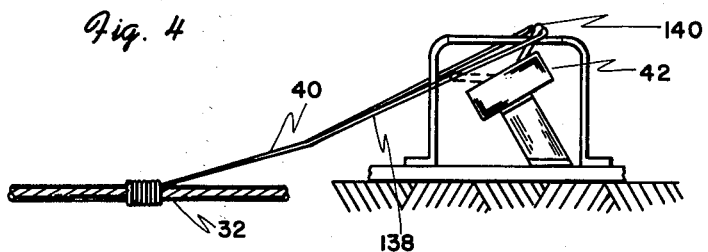
FIGURE 9 is a side elevational view of the cable and arming switch detail also shown in FIGURE 1.

In FIG. 9, the messenger 40 causes the normally open arming switch 42 to be sensitive to initial movement of the slack cable section 32. As the cable section 32 starts moving with the craft, a loop 138 carried by the messenger 40 operates a switch lever 140 carried by the switch 42, thus closing the switch 42. The loop 138 then freely separates from the switch and is taken along by the cable section 32 in the direction of movement of the craft.

Figure 10:
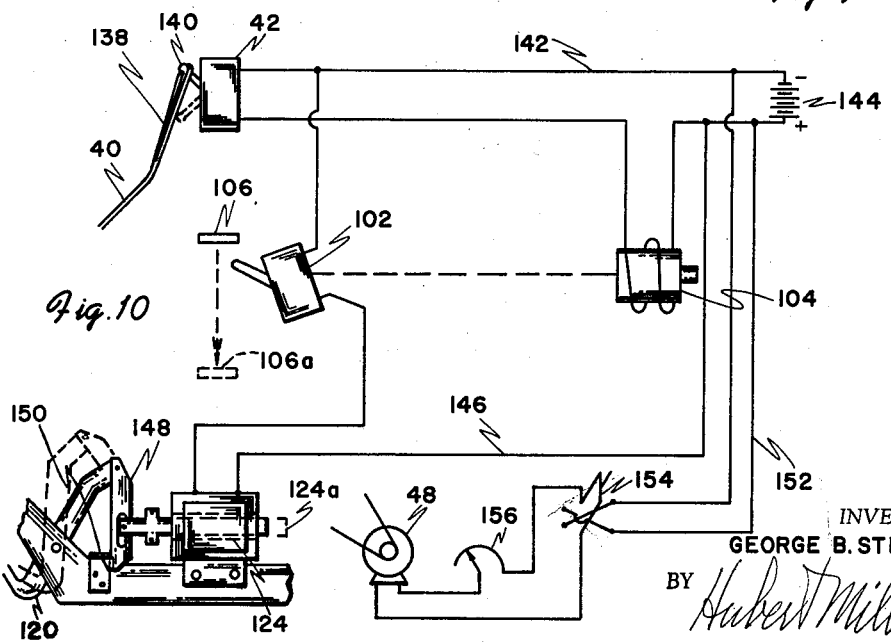
FIGURE 10 is a schematic diagram of the control circuit.

In FIG. 10, the arming solenoid 104 (FIG. 4) is shown connected to the arming switch 102. Current is supplied thereto through an arming circuit 142 which includes a battery or other current source 144. The source 144 also supplies a release circuit 146 which includes the release solenoid switch 102 in circuit with the release solenoid 124.

In response to current flowing in the circuit 142, the solenoid 104 moves the switch 102 into the immediate path of the actuator 106 (FIG. 4), and the actuator 106 in advancing in its path toward the dotted line position 106a closes the switch 102. The armature of the solenoid 124 moves to the dotted line position 124a, withdrawing a pincer latch 148 from a fixed latch plate 150. The pincers 120 open to release the loop 122 (FIG. 5), thus releasing the snapline so as to entrain the cable on the rolls 56.

The current source 144 supplies a motor-operating circuit 152 which is connected to the terminals of the drum motor 48 and which includes a reversing switch 154 and a speed rheostat 156.

In operation of the overall cable system of the preceding figures, the cable occupies the solid line position shown by the solid lines in FIGS. 1 and 3 respectively, preparatory to being engaged by the aircraft 22 of FIG. 1. The arming switch 42 has the normally open position shown in FIGS. 9 and 10, and the arming solenoid 104 and the release solenoid switch 102 occupy the position shown in FIG. 10. The approach speed of the craft 22 to the landing strip 20 is either predicted from experience or determined from observation or by radar or other apparatus, and the initial rolling speed which the aircraft will have after touching down on the runway can thus be fairly accurately estimated in advance. By appropriate use of the switch 154 and the speed rheostat 156, an operator of the drum mechanism 36 sets the drum 46 in motion in the direction of the arrow of FIG. 3 and, by referring to the speedometer 96, he establishes the peripheral rotation of the drum at a speed to match the estimated speed.

When the craft 22 touches down, it engages the loop 26 and closes the arming switch 42. The switch 102 is moved by the arming solenoid 104 into the solid line position shown in FIG. 4. Somewhere within the next full revolution of the rotating drum, the actuator 106 closes the switch 102, thus releasing the coupling 68 to the snap action provided by the snapline 82. The short-billed hook 118 of the moving snapline 80 moves forwardly so as to train the cable between the rolls 56, and to disengage the section 34 from cable clamp 98 and from bracket 128, whereupon the hook 118 disengages. The cable begins unfeeding from the drum 46 at the estimated speed of the craft 22.

The switch 154 is opened by the operator, allowing the motor 48 to coast. Gradually the brake control lever 78 is operated to remove the remaining slack from the cable and the operator then brakes the speed of the moving craft 22.

The craft is either brought to a stop or substantially slowed, whereupon the pilot of the craft releases the hook from the hook-on loop 26 so as to free the cable from the craft. The operator then closes the switch 154 in the opposite direction and rewinds the cable 34 onto the drum 46, preferably under back tension. The cable is restored to the position of FIG. 3, with the coupling re-anchored to the support 54, whereupon the operator resurrects the snapline mast 82 to its inclined position and reconnects the hook 118 between the snapline 80 and the rod 116 fast to the coupling 68. The other parts are restored to their initial condition, leaving each of the respective circuits 142, 146, and 152 deenergized.

The operation is then repeated.

From the foregoing, it is apparent that the invention accomplishes several critical functions. The bulk of the cable is mounted on the drum which is already undergoing preliminary rotation. The slack provided in the cable section 32 between the arming switch 42 and the drum mechanism 36 functions to allow the drum cable to start unfeeding in an orderly manner before the full force of engagement of the aircraft can be communicated to the drum itself. Finally, the restrained free end portion of the cable on the drum is timed to release when, and only when, it reaches approximately the top of the drum, so as to start unfeeding in a tangential direction of payout having both the speed and direction of the craft to be braked.

As presently illustrated, the invention is shown to embody an automatic arming circuit 142 which senses the landing and which moves the switch 102 into the path of the actuator 106 carried by the drum 46. It is evident that the operator can judge the time of landing equally well by eye and, if he prefers, he can move the switch 102 into the extended position so that the cable releases. In this way, he manually controls the steps of cable release at the proper time.

What is claimed is:

1. In an aircraft arresting system of the cable-braking type, said system having a hook-on loop disposed in a slightly elevated position in the landing path of the craft and adapted to be hooked by the craft as it moves past the loop, the combination of: a drum of braking cable and having braking means which, when applied, slows the unfeeding rate of cable from the drum; a slack cable section for securement of the drum braking cable to the hook-on loop, and having one end confronting the end of a retained free end of the cable of said drum; interposed means in the cable substantially aligned with the drum axis and constructed and arranged to couple said ends so as to afford coaxial relative rotation, enabling the drum and cable to rotate and said adjacent end of the slack cable section to remain stationary; and means for rotating said drum at a peripheral speed approximating the anticipated landing speed, so that braking cable initially unfeeding from the drum is already moving at approximately the speed of the craft to be arrested.

2. Aircraft arresting system of the cable-braking type comprising: a hook-on loop having a slightly elevated position in the landing path of the craft and adapted to be hooked by the craft as it moves past the loop; a braking cable drum having braking means which, when applied, slows the unfeeding of cable stored on the drum; a cable section leading from the vicinity of the drum and secured to the loop for interconnecting it and the braking cable on the drum; a swivel coupling having a bearing and interposed in the cable between a retained free end portion of the braking cable on the drum and the adjacent end of the cable section; said coupling stationarily supported in substantial alignment with the drum axis, so as to afford coaxial relative rotation enabling the drum and cable to rotate and said adjacent end of the cable section to remain stationarily supported by the coupling; and means for rotating said drum at a peripheral speed approximating the linear speed estimated for the craft when it lands, so that braking cable initially unfeeding from the drum is already moving at approximately the speed of the craft to be arrested.

3. Aircraft arresting system of the cable-braking type comprising: a hook-on loop having a slightly elevated position in the landing path of the craft and adapted to be hooked by the craft at it moves past the loop; a drum of braking cable and having braking means which, when applied, slows the unfeeding rate of cable from the drum; a cable section leading from the vicinity of the drum and secured to the loop for interconnecting it and the braking cable on the drum; a swivel coupling included between the free end of the braking cable retained on the drum and the adjacent end of the cable section; said coupling supported in substantial alignment with the drum axis, so as to afford coaxial relative rotation enabling the drum and cable to rotate and said adjacent end of the cable section to remain stationarily supported by the coupling; taut cable rolls between which the cable is adapted to be trained and operatively driven adjacent the drum in a location between it and said hook-on loop; and means for operatively driving said drum and cable rolls at peripheral speeds approximating the estimated linear speeds which the craft will have when they land, so that braking cable initially unfeeding from the drum is already moving at approximately the speed of the craft to be arrested.

4. A system according to claim 3, further comprising: fast-acting means having a releasable connection to said coupling for yanking the cable section so as to drag and train the free end of cable on the drum aforesaid between said rolls; said driving means effective to operatively drive the rolls with a peripheral speed slightly faster than the peripheral speed of said drum.

5. A system according to claim 4, and further comprising: mechanism for actuating said fast-acting means, including means sensitive to initial movement of the hook-on loop by the craft, whereby unfeeding from the drum is delayed until the craft starts taking up slack in the cable section.

6. A system according to claim 4, further comprising: releasable cable-retaining means effective to retain said free end of the cable to the drum during preliminary rotation as aforesaid, and adapted under the unfeeding action of the cable rolls to release said free end of the cable as said free end goes over the top of the drum.

7. A system according to claim 4, further comprising: a speedometer connected to said cable drum enabling the initial unfeeding and braking speeds of the cable to be determined with an accurate reading.

8. In an aircraft arresting system having a hook-on loop disposed in a slightly elevated position in the landing path of the craft, and adapted to be hooked by the craft as it moves past the loop, the combination of: a drum of braking cable and having means which, when applied, brakes the unfeeding rate of cable from the drum; a slack cable section for securement of the braking cable on the drum to the hook-on loop, and having one end confronting the end of a free end portion of the cable on said drum; means coupling said cable ends in alignment together, and constructed and arranged to afford coaxial relative rotation enabling the drum and cable to rotate relative to said one end of the cable section;

taut cable rolls between which braking cable can be trained and operatively related in alignment with the drum for stripping off the free cable end portion therefrom; first means actuable to train the cable between said rolls and operatively connected with said coupling means; retainer means on said drum for releasably retaining said free cable end portion thereon; and means responsive to the rotative position of said drum and connected to actuate said first means so that the roll strip the free end portion of the cable from the retainer while the free end portion is passing the top of the drum.

9. In an aircraft arresting system having a hook-on loop disposed in a slightly elevated position in the landing path of the craft, and adapted to be hooked by the craft as it moves past the loop, the combination of: a drum of braking cable and having means which, when applied to the drum, brakes the unfeeding rate of cable therefrom; a slack cable section for securement of the braking cable on the drum to the hook-on loop, and having one end confronting the end of a retained free end portion of the cable on said drum; means coupling said cable ends in alignment together, and constructed and arranged to afford coaxial relative rotation enabling the drum and cable to rotate and said one end of the cable section to remain stationary; cable rolls for receiving braking cable to be trained therebetween, and operatively related in alignment with the drum for stripping off the retained free cable end portion therefrom; releasable means actuable to automatically train the cable between said rolls, and being in operative relation to said cable drum and rolls and connected to said coupling means; a support common to said drum, rolls, and releasable means for supporting them in the operative relationship described; first contactable means shiftably mounted to said common support for movement into the path of and contact with an actuator carried by said drum; release switch means responsive to said contact operative to actuate said releasable-coupling-connected means for entraining said cable on the rolls, thereby causing stripping of the retained free end portion from said drum so as to initiate unfeeding the cable from the drum; means comprising an arming switch connected to said slack cable section and responsive to initial movement thereof for shifting said first contactable means into the path of said actuator; and drive means for rotating said drum and rolls at a peripheral speed which it is estimated will match the residual linear speed of the craft upon landing.

10. In an aircraft arresting system, the combination of claim 9, wherein said rolls are free of support at one end to afford access to and open reception of the cable trained therebetween; said drive means operative to rotate said rolls at a peripheral speed slightly in excess of the peripheral speed of said drum.

No references cited.